April 4, 1961 O. L. PATTERSON 2,978,178

COMPUTING CIRCUITS

Original Filed Jan. 13, 1954 3 Sheets-Sheet 1

(1) $E_2 = \frac{RE_3}{R+R_3} e^{-\frac{t_1}{Rc}}$ (2) $E_0 = \frac{RE_1}{R+R_1} e^{-\frac{t_1}{Rc}}$ (3) $E_0 = \frac{R+R_3}{R+R_1} \cdot \frac{E_1 E_2}{E_3}$ (4) $E_0 = K \cdot \frac{E_1 \cdot E_2^{\frac{R_1C_1}{R_2C_2}}}{E_3^{\frac{R_1C_1}{R_2C_2}}}$ INVENTOR.
OMAR L. PATTERSON
BY Busser, Smith & Harding
ATTORNEYS (9) $$E_0 = \frac{1}{K}(E_A + e_A)(E_B + e_B)$$

(10) $$E_P = E_0 - \frac{1}{K}(E_A e_B + E_B e_A + e_A e_B) = \frac{E_A E_B}{K}$$

*INVENTOR.*
OMAR L. PATTERSON
*BY*
Busser, Smith & Harding
ATTORNEYS

INVENTOR.
OMAR L. PATTERSON
BY Busser, Smith & Harding
ATTORNEYS

United States Patent Office 2,978,178

Patented Apr. 4, 1961

2,978,178

COMPUTING CIRCUITS

Omar L. Patterson, Media, Pa., assignor to Sun Oil Company, Philadelphia, Pa., a corporation of New Jersey Original application Jan. 13, 1954, Ser. No. 403,799. Divided and this application Sept. 16, 1957, Ser. No. 684,630

4 Claims. (Cl. 235—193)

This invention relates to computing circuits and, particularly, to circuits for the performance of multiplication and/or division.

This application is a division of my application Serial Number 403,799, filed January 13, 1954.

Since the process of multiplication is non-linear, it presents a very difficult problem in electrical computing apparatus where a high degree of accuracy and response time are required. Multiplication has been accomplished by electromechanical devices, carrier waveform systems, non-linear elements, multivariable tube characteristics, and various modulation systems. Electromechanical devices and carrier systems are capable of providing accuracies of the order of 0.1 percent but have poor response time. On the other hand, systems involving non-linear elements and characteristics are generally restricted to a range of 1 to 5 percent in accuracy but are capable of a high speed of response.

The present invention relates to circuits for the performance of multiplication and/or division which combine high accuracy and good frequency response. As will become clear hereafter, the invention relates to what might be referred to as parametric multiplication and division, involving the introduction of a dependent parameter which is mathematically eliminated from a pair of equations to secure multiplication and/or division.

Figure 1:
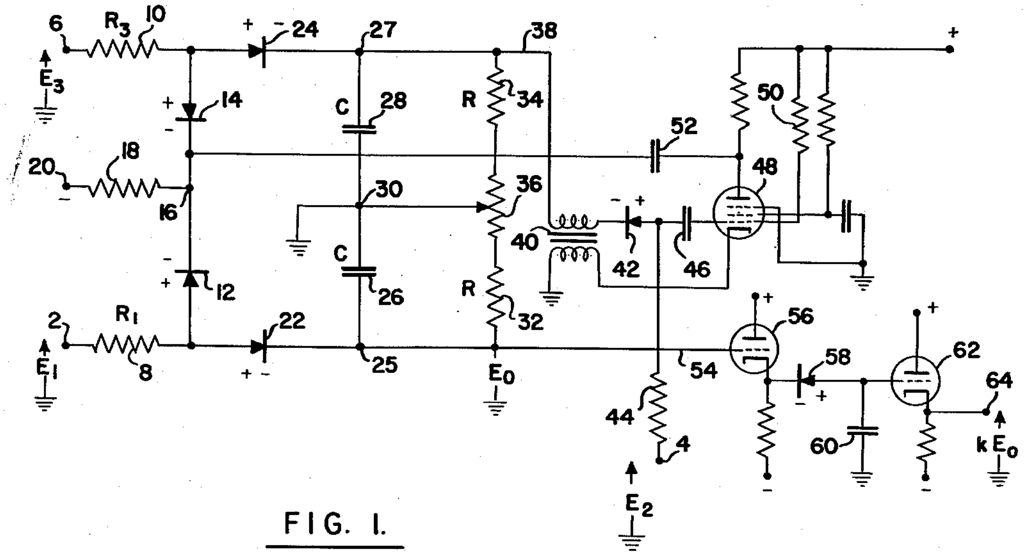
Figure 2:
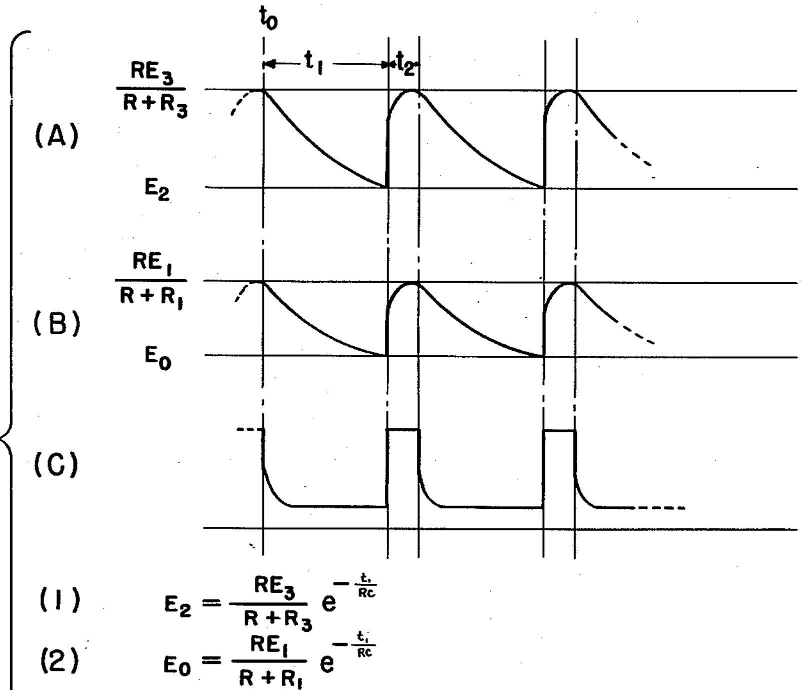
Figure 3:
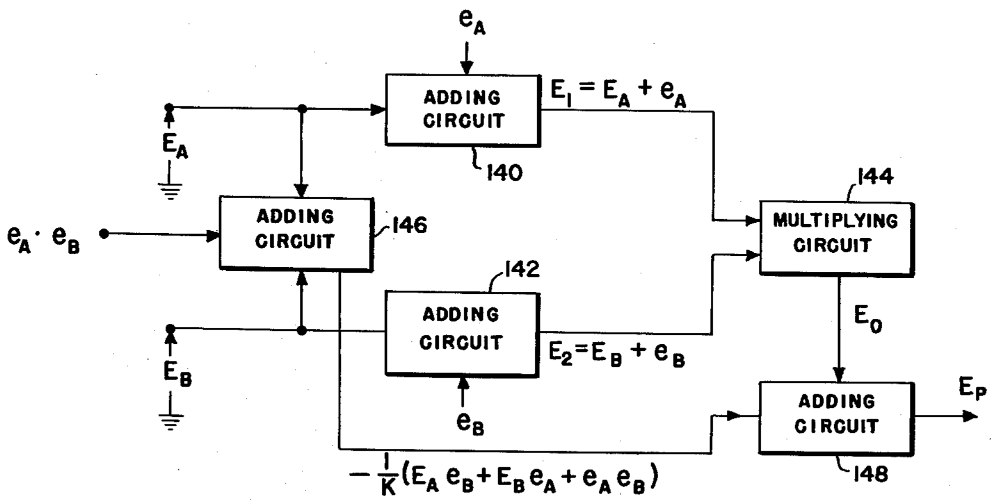
Figure 4:
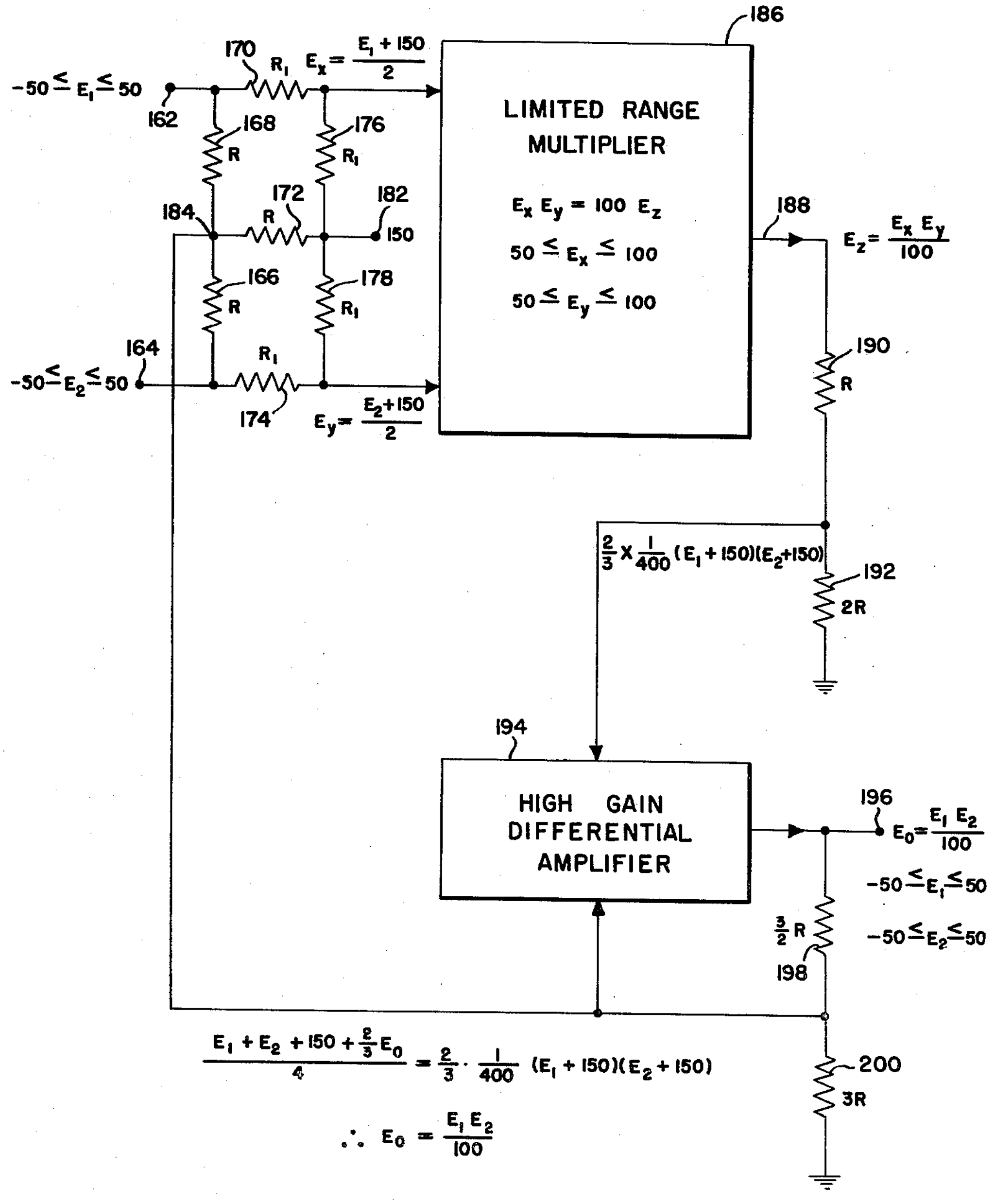

The general object of the invention as well as detailed objects particularly relating to features of construction and operation will become apparent from the following description read in conjunction with the accompanying drawings, in which:

Figure 1 is a wiring diagram illustrating one embodiment of the invention utilized for the carrying out of multiplying or dividing computations;

Figure 2 comprises curves illustrating the operation of the circuit of Figure 1 and also embodies certain equations pertinent thereto;

Figure 3 comprises a block diagram and various equations pertinent thereto, the diagram illustrating the fashion in which negative as well as positive quantities may be multiplied or divided; and Figure 4 is a diagram and various expressions pertinent thereto illustrating a further fashion in which negative as well as positive quantities may be multiplied.

Reference may be made first to Figure 1 which shows a circuit capable of producing high accuracy results with rapid response. With a resolution time of ten microseconds an accuracy of about 1% may be obtained with this circuit while an accuracy of 0.1% may be obtained with a resolution of 100 microseconds.

Input potentials which are to be multiplied together and are indicated as $E_1$ and $E_2$ are applied, respectively, at terminals 2 and 4. A potential input $E_3$ is applied at terminal 6 and represents a quantity by which the product of $E_1$ and $E_2$ may be divided. In the case of multiplication alone, $E_3$ may be a constant and will appear as a constant of proportionality. On the other hand, if division is involved, $E_1$ or $E_2$ may be constant, and if merely a reciprocal of $E_3$ is desired, both may be constant. The particular fashion in which the potentials are applied may vary with the requirements. For high speed operation, low impedance sources are desirable and these may be provided through the use of cathode followers or other devices. The input signals themselves may have various origins, ranging from constant or slowly varying sources to sources involving rapid changes including, for example, the sampling of waveforms at particular instants as described in my application Serial No. 296,583, filed July 1, 1952. As will appear from what follows, the computation is completed in the circuit in each of a number of repeated cycles of operation and it need only be assumed that the input potentials are constant over the duration of a single period. If the inputs are waveforms having a common cycle of repetition, which cycle has a period which is long in comparison with the cycles of the present circuit, the product and/or quotient may be emitted as a waveform having the same repetition cycle as the inputs. It will become apparent, however, that the computing circuit is of very wide applicability to numerous types of computers and will give an output corresponding to what may be regarded as a steady state existing only for the duration of one of the repetition cycles of the circuit.

The terminals 2 and 6 are respectively connected through resistances 8 and 10 to the anodes of a pair of diodes 12 and 14, the cathodes of which are joined at 16 and connected through resistance 18 to a constant negative potential terminal 20. The anodes of the diodes 12 and 14 are connected through diodes 22 and 24, having polarities as indicated, to the ungrounded terminals of a pair of condensers 26 and 28 which are grounded at 30. The ungrounded terminals designated 25 and 27 are connected to resistors 32 and 34 in series with which there is located a potentiometer 36 the contact of which is grounded. As will become apparent hereafter, accuracy of operation depends upon the identity of the time constants of the two RC circuits involving the condensers 26 and 28, the resistors 32 and 34, and the resistance of potentiometer 36. Designating the capacities of the condensers 26 and 28 as C, and the resistances between terminal 25 and the potentiometer contact, and between terminal 27 and the potentiometer contact as R, the product RC must be maintained constant. For this purpose, it is desirable that the two RC circuits should be located in close proximity in a common housing to minimize the effects of temperature variations, with the two circuits employing elements having identical temperature coefficients. Any residual differences may be cancelled out by adjustment of the contact of potentiometer 36 or by providing fine adjustment of the capacities of the condensers 26 and 28. It may be remarked, as will appear hereafter, that the low reverse conductances of the diodes may play a minor part in the operation and the adjustment of the potentiometer may take these into account. In any event, the two circuits may be adjusted to secure very accurate correspondence of the time constants.

Employed in the circuit is a simple and accurate amplitude comparison circuit which is known as a multiar circuit and is described on page 343 of volume 19, Waveforms, of the Radiation Laboratory Series. The terminal 27 is connected at 38 to the secondary of a transformer 40 and through it to the cathode of a diode 42 which is connected through condenser 46 to the grid of a pentode 48 constituting the multiar tube. The anode of diode 42 is connected through resistor 44 to the terminal 4. The connections of the multiar circuit are convential and as indicated in the reference, these connections including the connection of the cathode of pentode 48 to ground through the primary of the transformer 40, and the connection of the control grid to the positive potential supply line through a high resistance 50.

The output from the anode of pentode 48 is connected through condenser 52 to the junction 16 of the cathodes of diodes 12 and 14.

The terminal 25 is connected to a demodulator which comprises the connection 54 to the grid of a triode 56 in a cathode follower arrangement returning to a fixed negative potential terminal. The cathode of triode 56 is connected to the cathode of a diode 58 the anode of which is connected to the ungrounded terminal of a condenser 60 and also to the grid of a triode 62 also arranged in a cathode follower circuit returned to the negative potential source. The output is taken from the cathode of triode 62 through terminal 64.

The diodes illustrated in the circuit may be either of vacuum or crystal type.

The operation may be best described by assuming, as will be justified later, that the multiar circuit has effected a charging of condensers 26 and 28 by the delivery of a positive pulse through condenser 52 and that the multiar pentode 48 is, at the beginning of operation, highly conducting, with the result that at terminal 16 there is no output from the multiar which disturbs the existence of a negative potential at the terminal 16 resulting from current flow from terminal 6 through resistor 10, diode 14 and resistor 18, and from terminal 2 through resistor 8, diode 12 and resistor 18. Under these conditions, the anodes of diodes 22 and 24 will be at negative potentials lower than any occurring during operation about to be described so that the diodes 22 and 24 are cut off. Prior to this, the multiar will have produced a positive pulse at terminal 16 sufficient to effect cut-off of the diodes 12 and 14 so that charging of condensers 26 and 28 will have taken place respectively through resistances 8 and 10, with the result that the respective condensers will have been charged to potentials given by the expressions at the upper portions of the curves (B) and (A) in Figure 2, respectively. The resistances of resistors 8 and 10 are designated $R_1$ and $R_3$, respectively. The time $t_0$ may be considered the instant at which, following the charging just referred to, the diodes 22 and 24 are cut off.

The condensers 26 and 28 now discharge through the resistors 32 and 34 exponentially in accordance with the right-hand expressions in Equations 1 and 2, $t$ being the variable. These discharges are indicated graphically in the curves (A) and (B). The discharge continues until the potential of condenser 28 at terminal 27 reaches the value $E_2$ introduced at terminal 4. At the instant this equality is reached, the diode 42 begins to conduct to start to drive the control grid of pentode 48 negative, this control grid having theretofore been connected to the positive potential supply line through resistor 50. The action is regenerative, through the feedback afforded through transformer 40, and the pentode 48 is sharply cut off. A steep positive pulse is thus delivered through condenser 52 to terminal 16, cutting off diodes 12 and 14 and thus rendering conductive diodes 22 and 24 to initiate recharging of the condensers 26 and 28. This action occurs at the instant $t_1$.

During the drop of potential of terminal 25 of condenser 26, the potential $E_0$ of this terminal follows the exponential law given in Equation 2 of Figure 2 until the time $t_1$ at which the pentode 48 is cut off. Noting that the exponential functions in Equations 1 and 2 both have the identical value, it follows that $E_0$ has at this instant the value given by the Equation 3, representing the product of $E_1$ by $E_2$ divided by $E_3$ and multiplied by a constant depending upon the resistances, which constant is unity if $R_1$ equals $R_3$. As pointed out above, the RC product must be the same for the two condenser discharge circuits, including the back resistance of the diodes. Adjustment for such constant value of the time constant is provided by the adjustment of potentiometer 36.

The potential $E_0$ at the grid of triode 56 gives a corresponding potential at its cathode and current flows through the diode 58 to bring the condenser 60 to a potential corresponding to the minimum value of $E_0$. This condenser, in turn, is connected to the grid of the cathode follower triode 62 and an output is delivered at terminal 64 which, as indicated, is proportional to $E_0$. In general, simple cathode followers are useable in this demodulating circuit but high accuracy may be secured by the use of more elaborate cathode follower circuits involving differential amplification and feedback.

The pentode 48 now remains cut off for a period $t_2$ indicated in Figure 2 which is determined by the grid time constant consisting of the product of the value of the capacity at 46 multiplied by the sum of the resistances at 50 and 54. This time constant is so chosen as to make $t_2$ more than sufficient to allow complete recharge of the condensers 26 and 28. Since the positive pulse resulting from cut off of pentode 48 rises very rapidly, as indicated in curve (*c*) of Figure 2, the condensers 26 and 28 start recharging almost immediately after the instant $t_1$. This cuts off conduction through diode 42 and because of this action the usual trouble of "bouncing" which is experienced with multiar circuits is not encountered. With the initiation of recharging, the diode 58 is cut off so that the condenser 60 retains the charge which it received during the condenser discharge previously described. The demodulator, therefore, acts as a negative peak voltmeter, and the condenser 60 will be fully charged in a single cycle if triode 56 is arranged so as to be heavily conductive. The multiar recovers in the usual fashion, with a drop of its anode potential to a low value characteristic of heavy conduction of the pentode. The recovery time of the multiar is the main limitation on the speed of response obtainable with this type circuit, since the minimum time $t_1$ required for the exponential drop of potentials of the condensers must be sufficiently long to allow sufficient time for recovery of the multiar circuit before the initiation of the next cycle. It will be evident from what has been described that the multiplication indicated in Equation 3 may be very accurately carried out in a very short period.

In the foregoing it has been assumed that the simple multiplication-division of Equation 3 was to be performed and there was accordingly stressed the maintenance of equality of the time constants of the two condenser discharge circuits. However, if the time constants are unequal a more general result may be secured as expressed by Equation 4 in which K is a constant, $R_1C_1$ is the time constant of the circuit of condenser 28, and $R_2C_2$ is the time constant of the circuit of condenser 26. As will be evident from this equation powers of inputs other than unity may be involved and, specifically, by equating of $E_1$ with either $E_2$ or $E_3$ (the other being constant), $E_0$ will appear as any of a wide range of powers of $E_1$. If $E_1$ is a function of time slowly varying with respect to the periods of the repetition cycle a power function may be developed as a step function smoothable by filtering. Power functions may be thus far more accurately produced than by hitherto known methods.

The circuit of Figure 1 involves the same limitation as other known multiplying circuits of being unable to multiply directly negative quantities to give proper signs of outputs. However, this difficulty is readily overcome in accordance with what is diagrammed in Figure 3, involving association with the multiplying circuit of various adding circuits.

Assuming that it is desired to multiply quantities represented by potentials $E_A$ and $E_B$ which may have either positive or negative values, with the result of securing properly signed products, the potential $E_A$ is added in a conventional adding circuit 140 to a fixed positive potential $e_A$ which is of such magnitude that the sum will always be positive. The potential $E_B$ is likewise added in a circuit 142 to a fixed potential $e_B$ having the same property of producing a sum output which will always be positive. These two positive quantities are then introduced into the multiplying circuit 144 which may be of the type shown in Figure 1 or, in fact, of many other types. The product $E_0$ from the multiplying circuit will then have the form indicated in Equation 9 in which K is a constant. A further adding circuit 146 is provided which not only has the inputs $E_A$ and $E_B$ but an input corresponding to the product of $e_A$ and $e_B$. It should be noted that these last quantities are constants and, accordingly, this last introduction amounts only to the introduction of a fixed potential. In the adding circuit 146, by means of suitable resistances and potentiometers, the inputs are added to provide an output which is indicated in the diagram. It should here again be noted that $e_A$ and $e_B$ are merely constants and, therefore, represent mere proportions of the inputs $E_B$ and $E_A$. The output from the adding circuit 146 is fed to an adding circuit 148 where it is added to $E_0$ from the output of the multiplying circuit. The output of circuit 148 designated $E_p$ is as given in Equation 10 from which it will be noted that it is proportional to the product of $E_A$ and $E_B$. The adding circuits may be of any well-known types, the term "adding" being here used to include subtraction. For example, highly precise circuits of this type are disclosed in my application Serial No. 239,279, filed July 30, 1951, now Patent No. 2,855,145, issued October 7, 1958. It will be evident that following this procedure the multiplication of negative quantities will result in products of proper sign.

Another circuit for extending the range of multiplication to that of negative quantities is illustrated in Figure 4 and involves the use of a high gain differential amplifier. In explanation of the operation there are indicated in Figure 4 potentials appearing at various points of the circuit, and for purposes of illustration it is assumed that the input potentials to be multiplied vary from minus 50 volts to plus 50 volts, the numerical values of potentials being given consistent with such range of operation.

The potentials to be multiplied are $E_1$ and $E_2$ applied to the respective terminals 162 and 164. These terminals are connected to an array of resistors 166, 168, 170, 172, 174, 176 and 178. The junction of resistors 176 and 178 is connected to a terminal 182 to which there is applied 150 volts. A limited range multiplier, i.e., one which will operate only on positive input potentials, is indicated at 186 and may be of any of the types previously described or other conventional types. Its inputs are provided, respectively, from the junction of resistors 170 and 176 and from the junction of resistors 174 and 178. Its output is delivered at 188 to the series arrangement of resistors 190 and 192 running to ground. A high gain differential amplifier has one input provided from the junction of resistors 190 and 192, and its other input from the terminal 184 at the junction of resistors 166 and 168. The output of the differential amplifier is to a terminal 196 and to the series arrangement of resistors 198 and 200 running to ground. The junction of these last resistors is connected to the same input as the terminal 184.

It will be noted that certain of the resistors mentioned have the same value R, while resistor 192 has a value 2R, resistor 198 has a value three-halves R and resistor 200 has a value 3R. Resistors 170, 176, 178 and 174 have equal values $R_1$ which need not be related to R.

By following the voltage legends at the various terminals and connections, the operation of the circuit will be apparent. At terminals 162 and 164 the applied potentials $E_1$ and $E_2$ may vary both positively and negatively. Through the introduction of the positive 150 volt potential at terminal 182, the inputs to the multiplier are made essentially positive. The output of the multiplier is also essentially positive. The high gain differential amplifier receives only positive potentials, but, since it operates between a high positive potential and a high negative potential, its output may be either positive or negative within the limits of operation. It will be noted that a scale factor of 100 is introduced in the value of the output potential $E_0$ so that the differential amplifier output varies within reasonable limits even though both of the inputs may be 50 volts.

What is claimed is:

1. Apparatus of the type described comprising a pair of terminals connected respectively to potential sources, a first pair of diodes connected in series between said terminals with their corresponding electrodes connected to said terminals and their other electrodes connected to a junction, a source of potential connected to said junction to render said diodes normally conducting, a pair of time constant resistance-capacitance circuits, a second pair of diodes respectively connecting said time constant circuits to said terminals, said diodes of the second pair being disposed so as to be cut off when the diodes of the first pair are conducting and to be conducting when the diodes of the first pair are cut off, whereby, during the last mentioned condition said time constant circuits may be changed through the last mentioned diodes from the respective terminals, means establishing a fourth potential source, means responsive to substantial equality of said fourth potential and the potential of one of said time constant circuits to provide to said junction a potential to cut off the first mentioned diodes, and means for sampling the potential of the other of said time constant circuits at the time of cut off of the first mentioned diodes.

2. Apparatus according to claim 1 in which said sampling means is in the form of a peak voltmeter circuit.

3. Apparatus according to claim 1 in which said means providing a potential to the junction to cut off the first mentioned diodes is a multiar circuit.

4. Apparatus according to claim 2 in which said means providing a potential to the junction to cut off the first mentioned diodes is a multiar circuit.

References Cited in the file of this patent

UNITED STATES PATENTS 2,652,194 Hirsch ---------------- Sept. 15, 1953

OTHER REFERENCES

Proceedings of the IRE (Broomall et al.), May 1952, pages 568–572.

Trans. of the IRE, Prof. Group on Electronic Computers (Freeman et al.), March 1954, pages 11–17.